(12) United States Patent
Kim

(10) Patent No.: US 10,320,947 B2
(45) Date of Patent: Jun. 11, 2019

(54) METHOD OF DESIGNING BUSINESS LOGIC, SERVER PERFORMING THE SAME AND STORAGE MEDIUM STORING THE SAME

(71) Applicant: LG CNS CO., LTD., Seoul (KR)

(72) Inventor: Sookil Kim, Seoul (KR)

(73) Assignee: LG CNS CO., LTD., Seoul (KR)

( * ) Notice: Subject to any disclaimer, the term of this patent is extended or adjusted under 35 U.S.C. 154(b) by 1266 days.

(21) Appl. No.: 14/465,324

(22) Filed: Aug. 21, 2014

(65) Prior Publication Data
US 2015/0058267 A1 Feb. 26, 2015

(30) Foreign Application Priority Data
Aug. 23, 2013 (KR) .................. 10-2013-0100688

(51) Int. Cl.
*G06Q 10/06* (2012.01)
*H04L 29/06* (2006.01)

(52) U.S. Cl.
CPC ............. *H04L 67/42* (2013.01); *G06Q 10/06* (2013.01)

(58) Field of Classification Search
CPC ..... G06F 8/10; G06F 8/20; G06F 8/24; G06F 17/30; G06F 11/3672; G06F 11/3688; H04L 67/42; G06Q 10/067; G06Q 10/06
USPC .................................................. 717/100–135
See application file for complete search history.

(56) References Cited

U.S. PATENT DOCUMENTS

| | | | | |
|---|---|---|---|---|
| 6,859,922 B1 * | 2/2005 | Baker | ................. | G06F 11/3414 705/51 |
| 7,324,976 B2 * | 1/2008 | Gupta | .................... | G06Q 20/02 705/65 |
| 7,694,140 B1 * | 4/2010 | Sachenko | ............... | H04L 67/02 709/203 |
| 7,822,826 B1 * | 10/2010 | Savchenko | ............... | G06F 8/61 709/217 |
| 8,180,849 B2 * | 5/2012 | Viegener | ................. | H04L 67/28 709/217 |
| 8,447,641 B1 * | 5/2013 | Kaza | ...................... | G06Q 30/00 705/7.14 |
| 2006/0036553 A1 * | 2/2006 | Gupta | .................... | G06Q 20/02 705/52 |

(Continued)

FOREIGN PATENT DOCUMENTS

KR 10-2009-0073061 7/2009
KR 10-2010-0101855 9/2010

OTHER PUBLICATIONS

Korean Intellectual Property Office Application Serial No. 10-2013-0100688, Office Action dated Aug. 22, 2014, 5 pages.

*Primary Examiner* — Marina Lee
(74) *Attorney, Agent, or Firm* — Lee Hong Degerman Kang & Waimey

(57) ABSTRACT

A method for designing business logic being performed on a computer server that includes respectively executing a test engine and a service engine independent of each other, receiving the business logic representing a business service from a modeling terminal, the business service being associated with an event, allowing the modeling terminal to register the business logic to the test engine and to test the business logic, and allowing the modeling terminal to register the business logic to the service engine when the test of the business logic is completed.

18 Claims, 12 Drawing Sheets

(56) References Cited

U.S. PATENT DOCUMENTS

| | | | |
|---|---|---|---|
| 2007/0156611 A1* | 7/2007 | Gupta | G06Q 20/02 705/78 |
| 2007/0208804 A1* | 9/2007 | Berna Fornies | H04L 67/02 709/203 |
| 2007/0300240 A1* | 12/2007 | Viegener | H04L 67/02 719/320 |
| 2008/0096507 A1* | 4/2008 | Erola | H04L 51/38 455/187.1 |
| 2009/0210427 A1* | 8/2009 | Eidler | G06F 11/1484 |
| 2011/0179007 A1* | 7/2011 | Shi | G06F 17/3089 707/706 |
| 2012/0304147 A1* | 11/2012 | Yang | G06Q 10/02 717/100 |
| 2013/0304616 A1* | 11/2013 | Raleigh | G06Q 20/145 705/34 |
| 2014/0211248 A1* | 7/2014 | Uchikawa | G06F 3/1287 358/1.15 |
| 2015/0058267 A1* | 2/2015 | Kim | H04L 67/42 706/14 |

* cited by examiner

METHOD OF DESIGNING BUSINESS LOGIC, SERVER PERFORMING THE SAME AND STORAGE MEDIUM STORING THE SAME

CROSS-REFERENCE TO RELATED APPLICATIONS

Pursuant to 35 U.S.C. § 119(a), this application claims the benefit of earlier filing date and right of priority to Korean Patent Application No. 10-2013-0100688, filed on Aug. 23, 2013, the contents of which are hereby incorporated by reference herein in their entirety.

BACKGROUND OF THE INVENTION

Field of the Invention

The present invention relates to business logic designing technology and more particularly to a method of designing business logic, a server performing the same, and a storage medium generating a business service when the business logic is defined to provide the business service in real time.

Background of the Invention

In general, a factory automation system may apply an Information Technology (IT) to a computer and an industrial robot to automate procedures such as order, design, manufacture, inspection and shipment according to a consistent concept. The IT may include an enterprise resources planning system (ERP), a manufacturing execution system (MES), computer aided design (CAD), and computer aided manufacturing (CAM). The IT may integrally manage through computerizing processes of production, manufacturing, distribution and finance in a company and may automate product production.

Korean Patent Publication No. 10-2010-0101855 (Sep. 20, 2010) discloses an application server development system in real time based on a repository using a diagram. The development system may include a modeling engine and an execution engine to unify many operations (e.g., design and source coding build and distribution) in a consistent view and to improve productivity and quality.

In the development system, the execution engine is distinguished for test and service, however, the development system may not independently manage a business logic for the test and service. Also, the development system may identically construct the business logic for the test and service so that memory may be wasted.

Korean Patent Publication No. 10-2010-0102086 (Sep. 20, 2010) discloses a method for constructing an enterprise customized digital production system using a digital factory being capable of pre-checking unnecessary waste elements. The method may produce and manufacture a virtual product by various scenarios to improve the producing and manufacturing process in an optimum state for product processing and manufacturing.

This method constructs the digital factory through modeling human and material resources so that it takes a lot of time. This is because human and material data is directly measured and collected for modeling the human and material resources. Also, the method has another problem that human and material resources may be updated for updating the digital factory.

Such applications may not independently manage test and service in an execution engine, however, this application may provide a method of designing a business logic for independently managing a test engine and a service engine.

SUMMARY

Embodiments of the present invention include a method of designing business logic capable of generating a business service when a business service is defined to provide the business service in real time.

Embodiments of the present invention include a method of designing business logic capable of independently managing a test engine and a service engine to control an access right for each of the test engine and service engine.

Embodiments of the present invention include a method of designing business logic capable of constructing business modeling through arranging a business diagram without a separate coding operation.

In some embodiments, a method of designing business logic performed on a business logic designing server includes (a) respectively executing a test engine and a service engine independent of each other, (b) receiving business logic representing a business service from a business modeling terminal, the business service being associated with an event, (c) allowing the business modeling terminal to register the business logic to the test engine and to test the business logic and (d) allowing the business modeling terminal to register the business logic to the service engine when the test of the business logic is completed.

In one embodiment, the method may further include (e) preventing a client terminal from connecting the executed test engine to perform the received business logic.

The operation (b) may include storing the received business logic in a repository. Operation (b) may include associating at least one of a business rule with a business service through the business modeling terminal before receiving the business logic.

In one embodiment, operation (b) may further include controlling accessibility for the at least one business rule through the business modeling terminal before associating the at least one business rule.

The accessibility may correspond to one of first through third closed states and first through second open states and the first closed state is a closed-service and non-executable state, the second closed state is an open-service and executable state, the third closed state is a closed-service, modifiable and executable state, the first open state is an open service and executable state and the second open state is an open service, modifiable and executable state.

The at least one business rule may be implemented through a related diagram, the related diagram connecting at least one logical function. The at least one business rule may be pre-compiled and be implemented as a function being dynamically connectable at a time performing the corresponding business rule.

In one embodiment, the method may further include an operation (e) canceling the registration of the business logic in the test engine when the business logic is registered in the service engine.

In one embodiment, the method may further include operation (f) performing the cancellation and the registration of the business logic in real time to cause the client terminal to immediately use the business service corresponding to the business logic.

The method may further include operation (e) performing the business logic through the service engine when the event is generated in the service engine.

In some embodiments, a business logic designing server includes an engine executing unit configured to respectively execute a test engine and a service engine independent of each other, a business logic receiving unit configured to receive business logic representing a business service from a business modeling terminal, the business service being associated with an event, a business logic test allowing unit configured to allow the business modeling terminal to register the business logic at the test engine and to test the business logic and a business logic registration allowing unit configured to allow the business modeling terminal to register the business logic to the service engine when the test of the business logic is completed.

In one embodiment, the server may further include a first business logic managing unit configured to prevent a client terminal from connecting the executed test engine to perform the received business logic.

The server may further include a second business logic managing unit configured to cancel the registration of the business logic in the test engine when the business logic is registered at the service engine.

The server may further include a business logic performing unit configured to perform the cancellation and the registration of the business logic in real time to cause the client terminal to immediately use the business service corresponding to the business logic.

In one embodiment, the server may further include a third business logic managing unit configured to perform the business logic through the service engine when the event is generated in the service engine.

In some embodiments, a machine-readable non-transitory medium having stored thereon machine-executable instructions for respectively executing a test engine and a service engine independent of each other, receiving a business logic representing a business service from a business modeling terminal, the business service being associated with an event, allowing the business modeling terminal to register the business logic to the test engine and to test the business logic and allowing the business modeling terminal to register the business logic to the service engine when the test of the business logic is completed.

Embodiments of the present invention may generate a business service when business logic is defined to provide the business service in real time.

Embodiments of the present invention may independently manage a test engine and service engine to control an access right for each of the test engine and service engine.

Embodiments of the present invention may construct a business modeling through arranging a business diagram without a separate coding operation.

DETAILED DESCRIPTION

Figure 1:
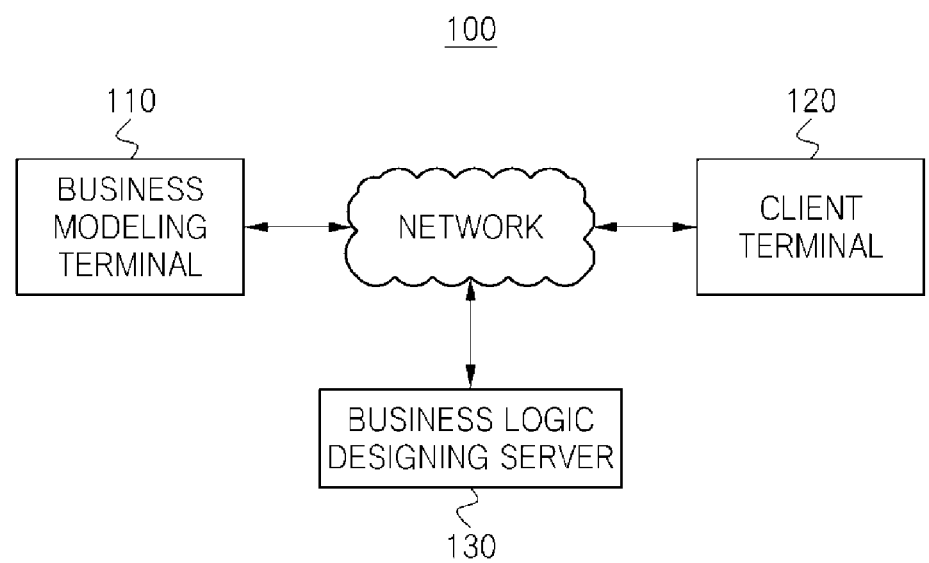
FIG. 1 is a block diagram showing a business logic designing system.

Explanation of the present invention is merely an embodiment for structural or functional explanation, so the scope of the present invention should not be construed to be limited to the embodiments explained in the embodiment. That is, since the embodiments may be implemented in several forms without departing from the characteristics thereof, it should also be understood that the described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

Terms described in the present disclosure may be understood as follows.

While terms such as "first" and "second," etc., may be used to describe various components, such components must not be understood as being limited to the above terms. The above terms are used to distinguish one component from another. For example, a first component may be referred to as a second component without departing from the scope of rights of the present invention, and likewise a second component may be referred to as a first component.

It will be understood that when an element is referred to as being "connected to" another element, it can be directly connected to the other element or intervening elements may also be present. In contrast, when an element is referred to as being "directly connected to" another element, no intervening elements are present. In addition, unless explicitly described to the contrary, the word "comprise" and variations such as "comprises" or "comprising," will be understood to imply the inclusion of stated elements but not the exclusion of any other elements. Meanwhile, other expressions describing relationships between components such as "between", "immediately between" or "adjacent to" and "directly adjacent to" may be construed similarly.

Singular forms "a", "an" and "the" in the present disclosure are intended to include the plural forms as well, unless the context clearly indicates otherwise. It will be further understood that terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Identification letters (e.g., a, b, c, etc.) in respective steps or operations are used for the sake of explanation and do not describe any particular order. The respective operations may be changed from a mentioned order unless specifically mentioned in context. Namely, respective steps may be performed in the same order as described, may be substantially simultaneously performed, or may be performed in reverse order.

The present invention may be implemented as machine-readable non-transitory codes on a machine-readable medium. The machine-readable medium includes any type of recording device for storing machine-readable data. Examples of the machine-readable recording medium include a read-only memory (ROM), a random access memory (RAM), a compact disk-read only memory (CD-ROM), a magnetic tape, a floppy disk, and optical data storage. The medium may also be carrier waves (e.g., Internet transmission). The computer-readable recording medium may be distributed among networked machine systems which store and execute machine-readable codes in a de-centralized manner.

The terms used in the present application are merely used to describe particular embodiments, and are not intended to limit the present invention. Unless otherwise defined, all terms used herein, including technical or scientific terms, have the same meanings as those generally understood by those with ordinary knowledge in the field of art to which the present invention belongs. Such terms as those defined in a generally used dictionary are to be interpreted to have the meanings equal to the contextual meanings in the relevant field of art, and are not to be interpreted to have ideal or excessively formal meanings unless clearly defined in the present application.

Figure 2:
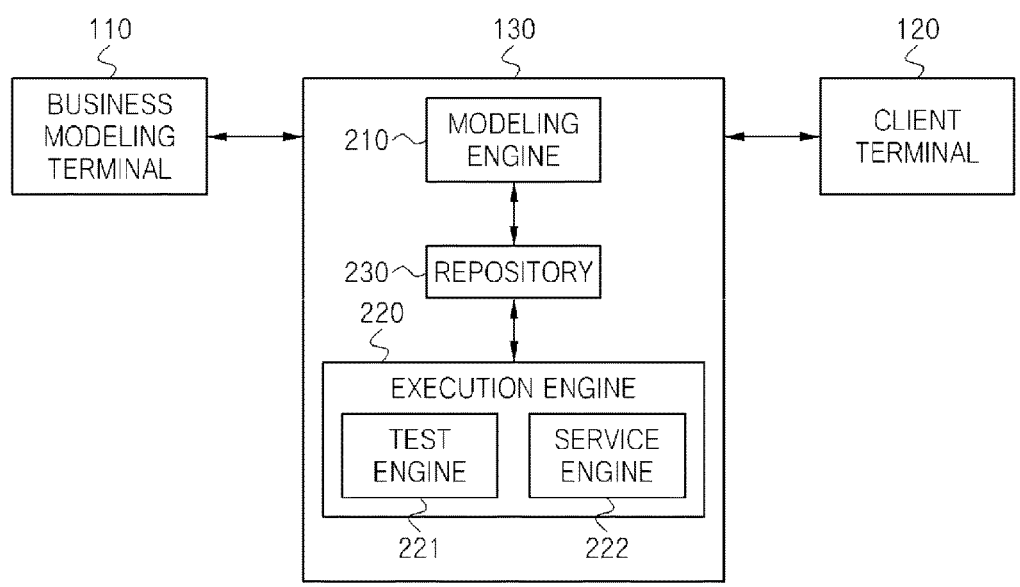
FIG. 2 is a detailed block diagram of the business logic designing system of FIG. 1.

FIG. 1 is a block diagram showing a business logic designing system and FIG. 2 is a detailed block diagram of the business logic designing system of FIG. 1. Referring to both figures, the business logic designing system 100 includes a business modeling terminal 110, a client terminal 120 and a business logic designing server 130.

The business modeling terminal 110 may design a business logic representing a business service. The business logic may be constructed through a diagram and a wizard. The business modeling terminal 110 may be connected with the business logic designing server 130 through a network to register the business logic in real time. The business modeling terminal 110 may be connected to a test engine 221 of the business logic designing server 130 and may test the business logic when the business logic is registered.

In one embodiment, the business modeling terminal 110 may manage a user authority for the business logic designing server 130. For example, the business modeling terminal 110 may set an access right for the business service at designing the business logic to register to the business logic designing server 130.

The business modeling terminal 110 may test the business logic registered in the test engine 221 of the business logic designing server 130. If the tested business logic is not abnormal, the business modeling terminal 110 may register the business logic to the service engine 222 of the business logic designing server 130.

The client terminal 120 may be connected with the business logic designing server 130 through the network to use the business service registered in the service engine 222 of the business logic designing server 130 in real time. The business service may be provided to the client terminal 120 through various interfaces.

The business logic designing server 130 may include a modeling engine 210, an execution engine 220 and a repository 230.

The modeling engine 210 may store and manage information for the business logic received from the business modeling terminal 110 in the repository 230. The modeling engine 210 may perform an application and a test in real time of the business logic designing server 130 through interworking with the execution engine 220.

The execution engine 220 may include the test engine 221 and the service engine 222 to independently manage the test engine 221 and the service engine 222. The test engine 221 may allow the business modeling terminal 110 to register the business logic and to test the business logic in real time. When the business logic is registered in the business modeling terminal 110, the service engine 222 may use the business logic in the client terminal 120.

The repository 230 may integrally store all business logic designed as a diagram in the business modeling terminal 110.

The business logic designing server 130 may provide a business data paging service that corresponds to a business service dividing into a suitable size (or page) for processing at a time to process by a page. In one embodiment, the business logic designing server 130 may monitor and analyze performance and error for the business service in real time through a real time service between the business modeling terminal 110 and the client terminal 120.

Figure 3:
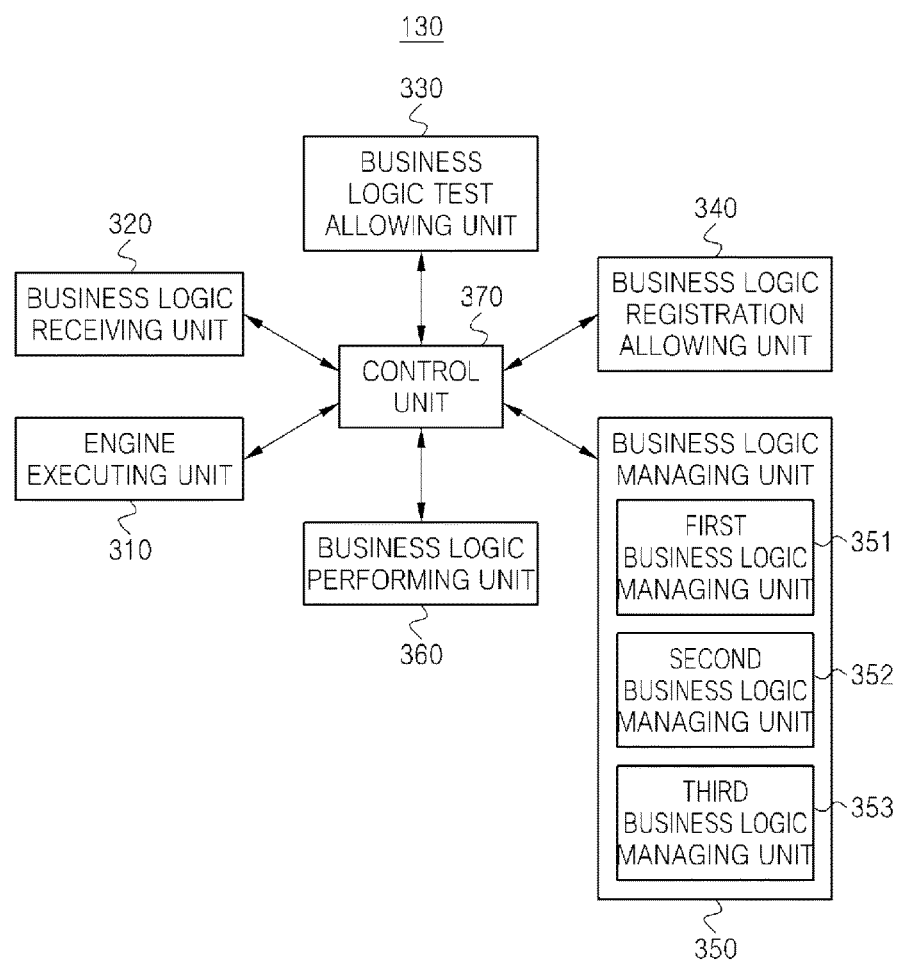
FIG. 3 is a block diagram of the business logic designing server of FIG. 1.

FIG. 3 is a block diagram of the business logic designing server of FIG. 1. In this figure, the business logic designing server 130 includes an engine executing unit 310, a business logic receiving unit 320, a business logic test allowing unit 330, a business logic registration allowing unit 340, a business logic managing unit 350, a business logic performing unit 360, and a control unit 370.

The engine executing unit 310 respectively executes the test engine 221 and the service engine 222 independent of each other. The test engine 221 and the service engine 222 may be implemented as a physical structure. In one embodiment, the engine executing unit 310 may execute the test engine 221 and the service engine 222 at the same time or at a specific time difference. For example, when a specific event is received from the client terminal 120 on a standby status, the engine executing unit 310 may execute the test engine 221 and the service engine 222 to provide a business service for the specific event.

The business logic receiving unit 320 receives the business logic representing the business service associated with the event from the business modeling terminal 110. The event may correspond to a specific business service requested from the client terminal 120. The business logic receiving unit 320 may store the business logic received from the business modeling terminal 110 in the repository 230.

In one embodiment, the business logic receiving unit 320 may store metadata for the business logic in the repository 230. For example, the business logic receiving unit 320 may store history, access right, and an index for the business logic in the repository 230. In one embodiment, the business logic receiving unit 320 may define at least one business rule. For example, the at least one business rule may be respectively defined as a function and may execute a specific business rule when a specific function is invoked by the client terminal 120.

The business logic receiving unit 320 may control accessibility for the at least one business rule through the business modeling terminal 110 before associating the at least one business rule. This accessibility may correspond to one of first through third closed states and first through second open states. The first closed state is a closed-service and non-executable state, the second closed state is an open-service and executable state, the third closed state is a closed-service, modifiable and executable state, the first open state is an open service and executable state and the second open state is an open service, modifiable and executable state.

The business logic receiving unit 320 may implement the at least one business rule through a related diagram connecting at least one logical function. For example, the at least one logical function may include a Start function, an End function, a Call function, an If function, a Switch function, a Loop function, and an Error function. The Call function may invoke the business logic and may map input and output values of the business logic, the If function may perform branching according to True or False of a conditional statement for the business logic, the Switch function may perform branching according to a variable condition of the business logic, the Loop function may designate a True or False condition according to an increase or a decrease of an index variable for the business logic to repetitively perform the increase or the decrease of the index variable designated as True and the Error function may generate an exception defined by the user.

The business logic receiving unit 320 may pre-compile each of the at least one business rule and may implement each of the at least one business rule as a function being dynamically connectable at a time performing a corresponding business rule. For example, the business logic receiving unit 320 may invoke the corresponding business rule based on a dynamic linking library (DLL) through a routine separated by a specific number. The dynamic linking library may decrease an execution file size of the corresponding business rule and may perform an encapsulation and an instantiation of the at least one logical function implementing the corresponding business rule.

In one embodiment, the business logic receiving unit 320 may check an executing frequency for each of the at least one business rule to store a specific business rule having a frequency exceeding a reference frequency in a memory (e.g., cache memory).

The business logic test allowing unit 330 allows the business modeling terminal 110 to register the business logic to the test engine 221 and to test the business logic. In one embodiment, when the event is generated in the client terminal 120 to cause the test engine 221 to be executed, the business logic test allowing unit 330 may detect a function for the at least one business rule associated with the business logic in the repository 230 to test the business logic. The business logic test allowing unit 330 may gradationally execute the at least one logical function and included related diagram for the business rule to test the business logic.

When the test of the business logic is completed, the business logic registration allowing unit 340 allows the business modeling terminal 110 to register the business logic to the service engine 222.

In one embodiment, when the test is completed, the business logic registration allowing unit 340 may connect the business logic to a legacy. For example, the business logic registration allowing unit 340 may separately manage a test module for testing the business logic and a performing module for performing the business logic to apply a rollback to the module so that a corresponding specific error is generated when the specific error is generated at the test module and the performing module.

The business logic managing unit 350 may include a first through third business logic managing units 351 through 353. The first business logic managing unit 351 may prevent the client terminal 120 from connecting the executed test engine 221 to perform the received business logic. The business logic may be registered to the test engine 221 and the service engine 222.

The second business logic managing unit 352 may cancel the registration of the business logic in the test engine 221 when the business logic is registered at the service engine 222. The business logic may be completely transferred to the service engine 222 from the test engine 221 to be registered to the service engine 222.

The third business logic managing unit 353 may perform the business logic through the service engine 222 when the event is generated in the service engine 222. When a specific business rule is selected in the client terminal 120, the third business logic managing unit 353 may cause the client terminal 120 to perform the business logic through the service engine 222.

The business logic performing unit 360 may perform the cancellation and the registration of the business logic in real time to cause the client terminal 120 to immediately use the business service corresponding to the business logic, The control unit 370 may control all operations of the business logic designing server 130 and may control data flow among the engine executing unit 310, the business logic receiving unit 320, the business logic test allowing unit 330, the business logic registration allowing unit 340, the business logic managing unit 350, and the business logic performing unit 360.

Figure 4:
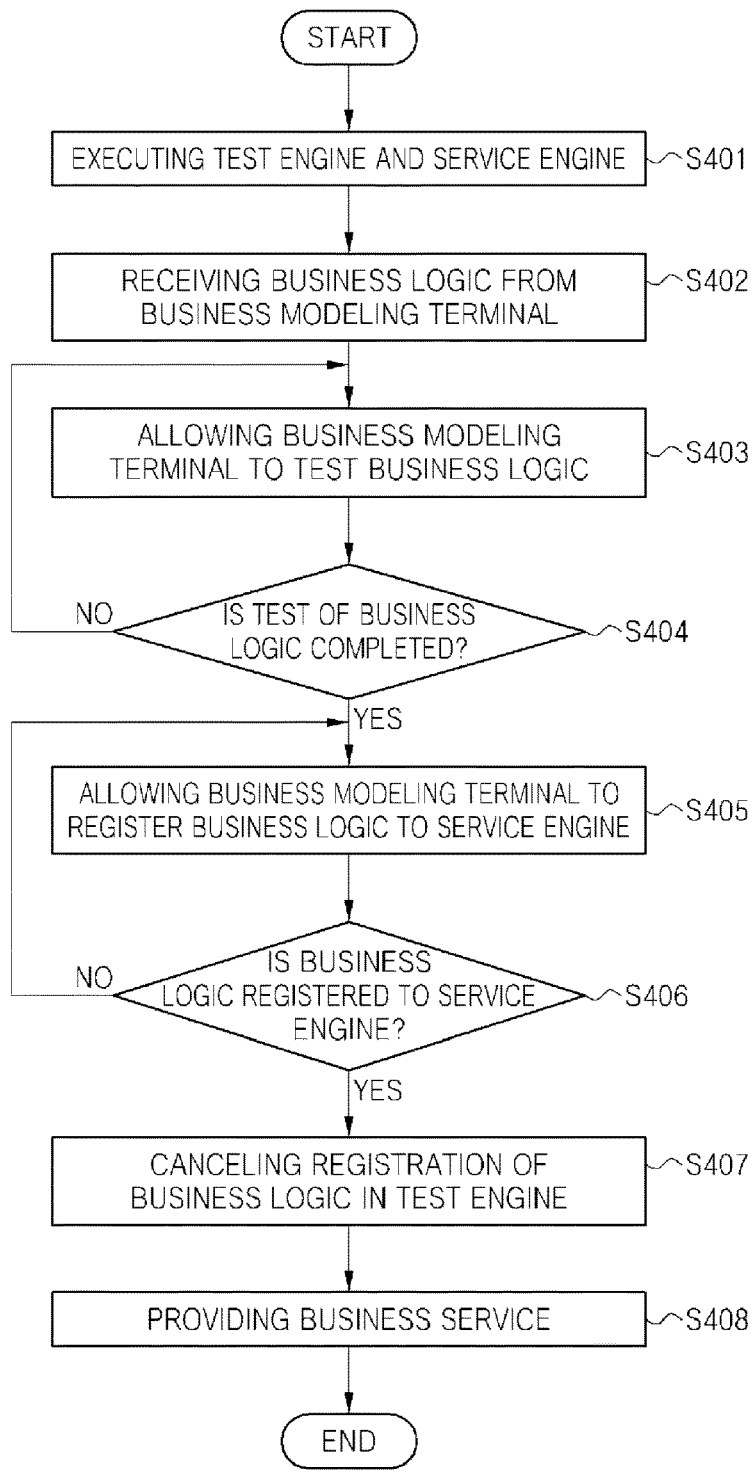
FIG. 4 is a flowchart of a business logic designing procedure being performed on the business logic designing server of FIG. 1.

FIG. 4 is a flowchart of a business logic designing procedure being performed on the business logic designing server of FIG. 1. In this figure, the engine executing unit 310 respectively executes the test engine 221 and the service engine 222 independent of each other (block S401).

The business logic receiving unit 320 receives the business logic representing the business service being associated with an event from the business modeling terminal 110 (block S402).

Figure 5:
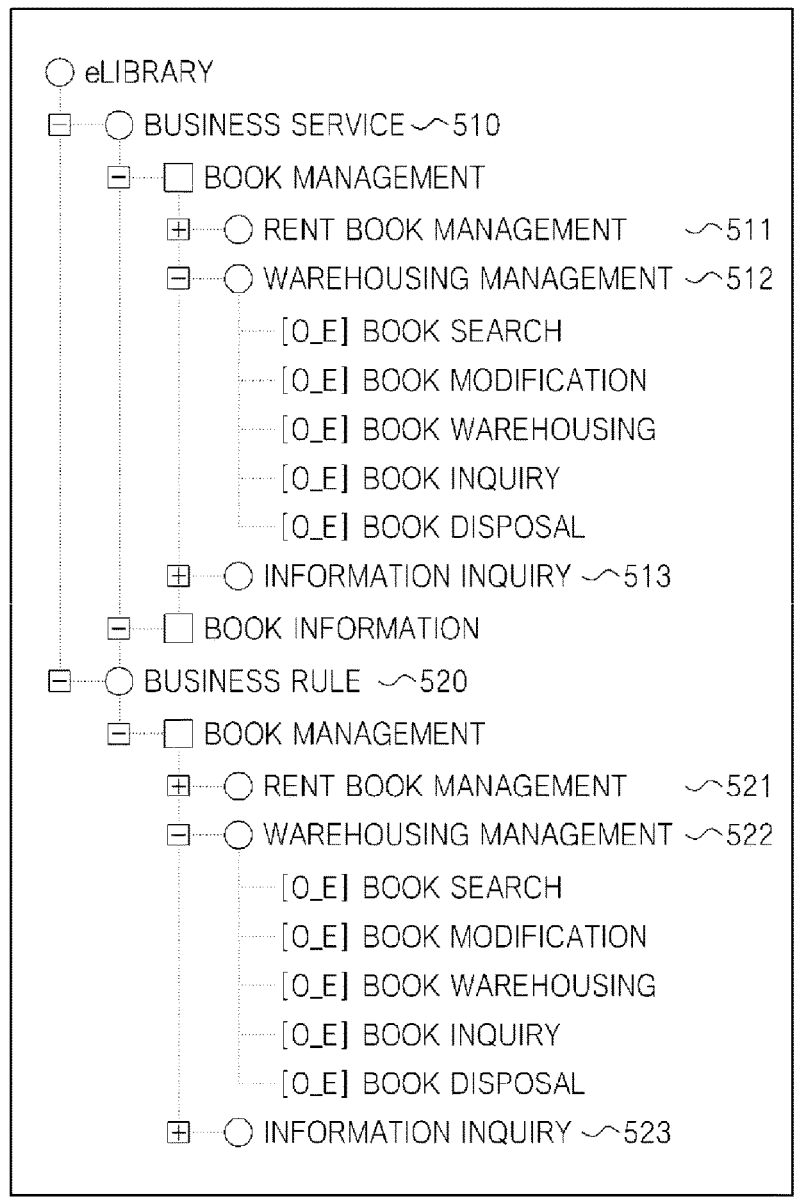
FIG. 5 is a diagram illustrating a business service and a business rule associated with a business service being implemented in the business logic designing server of FIG. 1.

The business logic receiving unit 320 may associate the at least one the business rule with the business service through the business modeling terminal 110 before receiving the business logic from the business modeling terminal 110. The business service and the business rule may be associated as 1:N. For example, looking ahead to FIG. 5, the business logic receiving unit 320 associates the business rule 520 with the business service 510 and may match the business rule logic (e.g., a rent book management 521, a warehousing management 522 and an information inquiry 523) of the business logic 520 with the business logic (e.g., a rent book management 511, a warehousing management 512 and an information inquiry 513) of the business service 510. The warehousing management 512 of the business logic may include a book search, a book modification, a book warehousing, a book inquiry and a book disposal. Each of the book search, the book modification, the book warehousing, the book inquiry and the book disposal included in the warehousing management 512 of the business logic may be associated for matching each of a book search, a book modification, a book warehousing, a book inquiry, and a book disposal included in the warehousing management 522 of the business rule logic.

The business logic receiving unit 320 may control the accessibility for the business rule through the business modeling terminal 110 before associating the business rule. The accessibility for the business rule may correspond to one of first through third closed states and the first through second open states and the first closed state is a closed-service and non-executable state, the second closed state is an open-service and executable state, the third closed state is a closed-service, modifiable and executable state, the first open state is an open service and executable state and the second open state is an open service, modifiable and executable state.

Figure 6A:
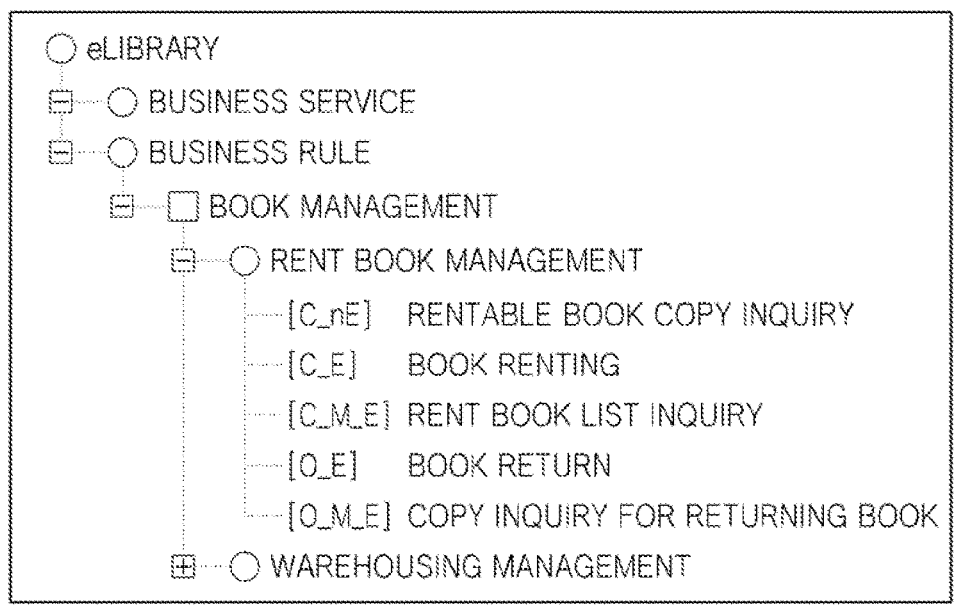
FIGS. 6(a) and 6(b) are diagrams illustrating accessibility for a business rule being implemented in the business logic designing server.
Figure 6B:
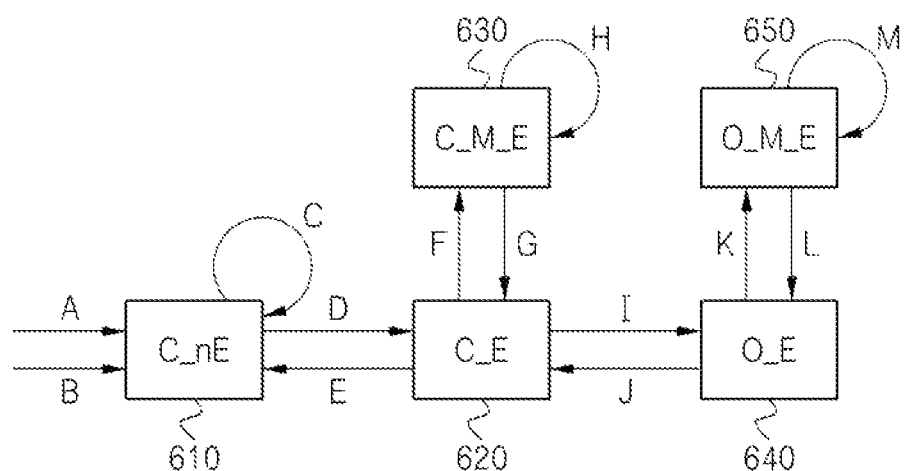

Referring now to FIGS. 6(a) and 6(b), the accessibility of the business rule may be represented as C_nE 610 of the first closed state, C_E 620 of the second closed state, C_M_E 630 of the third closed state, O_E 640 of the first open state and O_M_E 650 of the second open state.

The first closed state C_nE 610 may correspond to a closed state of the business logic, may test the business logic by a service unit, and may receive an input command (A) of a new business logic or receive (B) a cancel command of an existing business logic in the business modeling terminal 110 to update (C).

The second closed state C_E 620 may correspond to the closed state of the business logic, may test the business logic by a module unit, and may re-cancel (E) the business logic when the business logic is registered (D), change (F) to the third closed state C_M_E 630 for a modification or change (I) to the first open state O_E 640.

The third closed state C_M_E 630 may correspond to the closed state of the business logic, may modify a copy of the business logic not an original of the business logic to update (H), and return (G) the business logic to the second closed state C_E 620 when the modification of the business logic is completed.

The first open state O_E 640 may correspond to an open state of the business logic, may substantially implement the business logic to be matched with the business rule and may return (J) the business logic to the second closed state C_E 620 or change (K) to the second open state O_M_E 650 for the modification.

The second open state O_M_E 650 may correspond to the open state of the business logic, may modify the copy of the business logic not the original of the business logic to update (M) and return (L) the business logic to the first open state O_E 640 when the modification of the business logic is complete.

The first closed state C_nE 610, the second closed state C_E 620, and the third closed state C_M_E 630 may be implemented to be accessible to the business modeling terminal 110, and the first open state O_E 640 and the second open state O_M_E 650 may be implemented to be accessible to the client terminal 120.

The business logic receiving unit 320 may be implemented as the at least one business rule through the related diagram connecting the at least one logical function. For example, the at least one logical function may include a Start function, an End function, a Call function, an If function, a Switch function, a Loop function and an Error function. The Call function may invoke the business logic and may map input and output values of the business logic, the If function may perform branching according to True or False of a conditional statement for the business logic, the Switch function may perform branching according to a variable condition of the business logic, the Loop function may designate True or False condition according to an increase or a decrease of an index variable for the business logic to repetitively perform the increase or the decrease of the index variable designated as the True and the Error function may generate an exception defined by the user.

Figure 7:
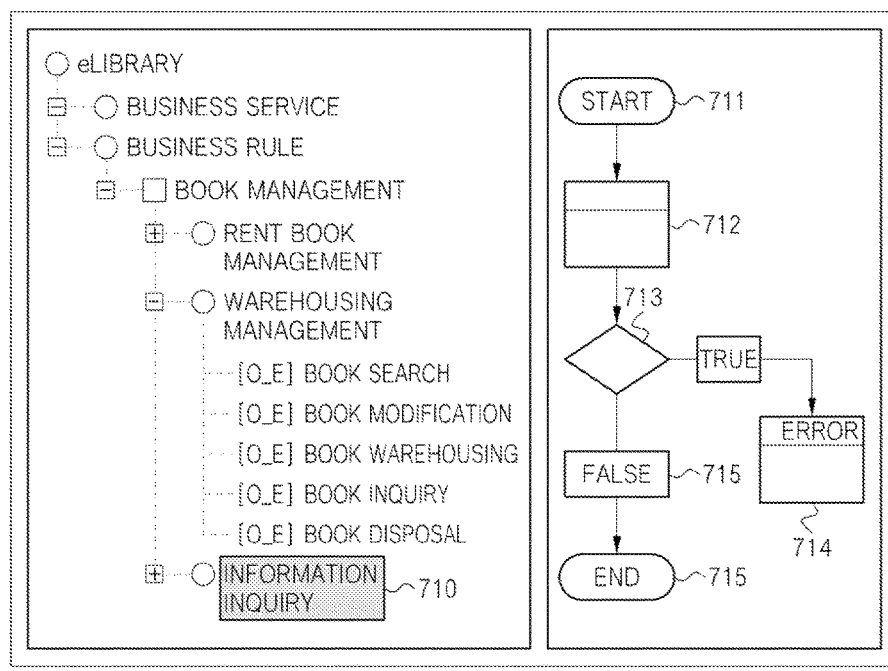
FIG. 7 is an example diagram of the business rule being implemented in the business logic designing server.

In FIG. 7, the business rule for an information inquiry 710 may be implemented as the related diagram connecting the Start function 711, the Call function 712, the If function 712, the Error function 714 and the End function 715. The Start function 711, the Call function 712, the If function 712, Error function 714, and the End function 715 may be arranged through drag and drop to be connected according to the input or output value.

Referring now to FIGS. 8(a) to 8(d), presented are example diagrams of the business rule being implemented in the business logic designing server. The related diagrams may be implemented based on the Call function, the If function, the Error function, or the Loop function.

Figure 8A:
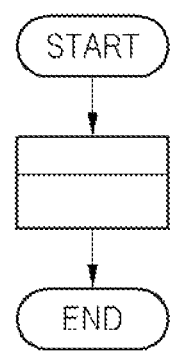
FIGS. 8(a) through 8(d) are example diagrams of the business rule being implemented in the business logic designing server.
Figure 8B:
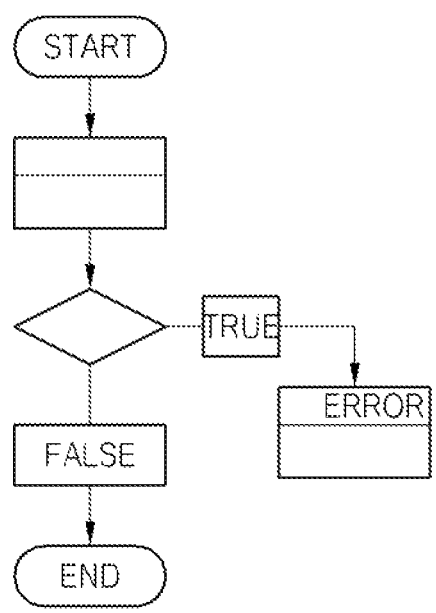
Figure 8C:
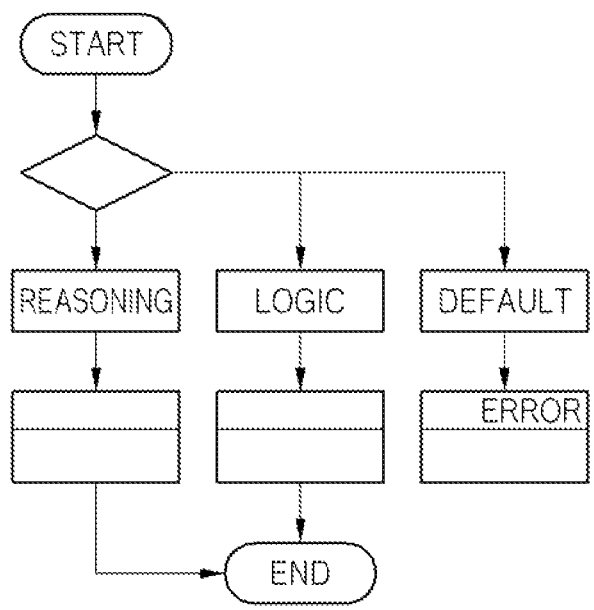
Figure 8D:
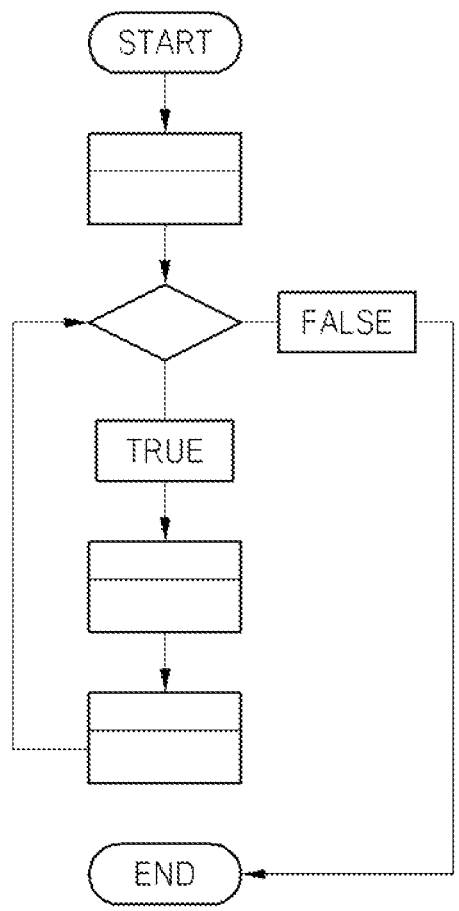

FIG. 8(a) is a diagram with a function having identified starting and ending features. FIG. 8(b) is a diagram with a function and decision function. When true, an error is identified and when false, the function is ended. FIG. 8(c) includes a decision tree which branches to respective reasoning, logic, and default blocks. The default block leads to an error function. FIG. 8(d) includes a decision by which when it is false, control branches to the end, but when it is true, multiple functions are performed in a looping fashion.

Referring back to FIG. 4, the business modeling terminal is allowed to test the business logic (block S403). When an error occurs in a test procedure of the business logic, the business logic test allowing unit 330 may associate the business logic and the error to store an error history database. The error history database may include an error occurrence cause, an error occurrence time and an error resolution mechanism.

When the test of the business logic is completed, the business logic registration allowing unit 340 allows the business modeling terminal 110 to register the business logic to the service engine 222. An example of such registering is presented in blocks S404 and S405 of FIG. 4.

When the business logic is registered to the service engine 222, the second business logic managing unit 352 cancels the registration of the business logic from the test engine 221. An example of this feature is presented in blocks S406 and S407 of FIG. 4.

The business logic performing unit 360 performs the cancellation and the registration of the business logic in real time to cause the client terminal 120 to immediately use the business service corresponding to the business logic. An example of this is presented in block S408 of FIG. 4.

Although this document provides descriptions of preferred embodiments of the present invention, it would be understood by those skilled in the art that the present invention can be modified or changed in various ways without departing from the technical principles and scope defined by the appended claims.

DESCRIPTION OF SYMBOLS

100: BUSINESS LOGIC DESIGNING SYSTEM
110: BUSINESS MODELING TERMINAL
120: CLIENT TERMINAL
130: BUSINESS LOGIC DESIGNING SERVER
210: TEST ENGINE
220: SERVICE ENGINE
230: REPOSITORY
310: ENGINE EXECUTING UNIT
320: BUSINESS LOGIC RECEIVING UNIT
330: BUSINESS LOGIC TEST ALLOWING UNIT
340: BUSINESS LOGIC REGISTRATION ALLOWING UNIT
350: BUSINESS LOGIC MANAGING UNIT
360: BUSINESS LOGIC PERFORMING UNIT
370: CONTROL UNIT

What is claimed is:
1. A method for designing business logic being performed on a computer server, the method comprising:
respectively executing, at the computer server, a test engine and a service engine independent of each other;

receiving, at the computer server, the business logic representing a business service from a modeling terminal, the business service being associated with an event;

registering the business logic to the test engine and testing the business logic using the test engine, based on communication from the modeling terminal;

registering the business logic to the service engine that is executing at the computer server, when the testing of the business logic is completed, based on communication from the modeling terminal; and providing, to a client terminal, the business service corresponding to the business logic registered in the service engine that is executing at the computer server.

2. The method of claim 1, further comprising:
preventing the client terminal from connecting to the executing test engine to perform the receiving of the business logic.

3. The method of claim 1, further comprising:
storing the received business logic in a repository.

4. The method of claim 1, further comprising:
associating at least one business rule with a business service through the modeling terminal before receiving the business logic.

5. The method of claim 4, further comprising:
controlling accessibility for the at least one business rule before associating the at least one business rule.

6. The method of claim 5, wherein the accessibility corresponds to one of first through third closed states and first through second open states; and
wherein the first closed state is a closed-service and non-executable state, the second closed state is an open-service and an executable state, the third closed state is a closed-service, modifiable and executable state, the first open state is an open service and executable state, and the second open state is an open service, modifiable and executable state.

7. The method of claim 4, wherein the at least one business rule is implemented through a related diagram, the related diagram connecting at least one logical function.

8. The method of claim 7, wherein the at least one logical function corresponds to one of Start function, an End function, a Call function, an If function, a Switch function, a Loop function, or an Error function.

9. The method of claim 4, wherein each of the at least one business rule is pre-compiled and is implemented as a function being dynamically connectable at a time performing the corresponding business rule.

10. The method of claim 1, further comprising:
canceling the registration of the business logic in the test engine when the business logic is registered in the service engine.

11. The method of claim 10, further comprising:
performing the cancelation and the registration of the business logic in real time to cause the client terminal to use the business service corresponding to the business logic.

12. The method of claim 1, further comprising:
performing the business logic through the service engine when the event is generated in the service engine.

13. A server implementing business modeling, the server comprising:

a memory storing machine-readable code; and
a controller configured to operate according to the stored machine-readable code to:
respectively execute a test engine and a service engine independent of each other;
receive a business logic representing a business service from a modeling terminal, the business service being associated with an event;
register the business logic to the test engine and test the business logic using the test engine, based on communication from the modeling terminal;
register the business logic to the service engine that is executing at the server, when the test of the business logic is completed, based on communication from the modeling terminal; and
providing, to a client terminal, the business service corresponding to the business logic registered in the service engine that is executing at the server.

14. The server of claim 13, wherein the controller is further configured to operate according to the stored machine-readable code to:
prevent the client terminal from connecting to the executing test engine to perform the receiving of the business logic.

15. The server of claim 13, wherein the controller is further configured to operate according to the stored machine-readable code to:
cancel the registration of the business logic in the test engine when the business logic is registered at the service engine.

16. The server of claim 15, wherein the controller is further configured to operate according to the stored machine-readable code to:
perform the cancelation and the registration of the business logic in real time to cause the client terminal to use the business service corresponding to the business logic.

17. The server of claim 13, wherein the controller is further configured to operate according to the stored machine-readable code to:
perform the business logic through the service engine when the event is generated in the service engine.

18. A non-transitory machine-readable medium having stored thereon machine-executable instructions for:
respectively executing a test engine and a service engine independent of each other;
receiving the business logic representing a business service from a modeling terminal, the business service being associated with an event;
registering the business logic to the test engine and testing the business logic using the test engine, based on communication from the modeling terminal;
registering the business logic to the service engine that is executing at the server, when the testing of the business logic is completed, based on communication from the modeling terminal; and
providing, to a client terminal, the business service corresponding to the business logic registered in the service engine that is executing at the server.

* * * * *